United States Patent [19]

Koike

[11] 4,069,617
[45] Jan. 24, 1978

[54] VEHICLE WINDOW GUIDE ASSEMBLY

[75] Inventor: Syouichi Koike, Seki, Japan

[73] Assignee: Nissan Motor Co., Ltd., Yokohama, Japan

[21] Appl. No.: 690,120

[22] Filed: May 26, 1976

[30] Foreign Application Priority Data

May 29, 1975 Japan .................................. 50-64522

[51] Int. Cl.² ........................................... E05D 13/02
[52] U.S. Cl. ........................................ 49/428; 49/440; 49/374
[58] Field of Search .......................... 49/227, 348–363, 49/372, 374, 375, 428, 440

[56] References Cited

U.S. PATENT DOCUMENTS 3,466,803  9/1969  Packett .............................. 49/374 X
3,591,983  7/1971  Hanson ............................... 49/227

Primary Examiner—Kenneth Downey
Attorney, Agent, or Firm—Frank J. Jordan

[57] ABSTRACT

Two or more guide following members fastened to a vehicle body window panel each comprises a plurality of projected slide surfaces in constant sliding engagement with the inner wall of a vertically elongate guide channel mounted on a vehicle body. The window panel is connected to the guide following member by means of a shaft carrying a ball joint.

4 Claims, 4 Drawing Figures

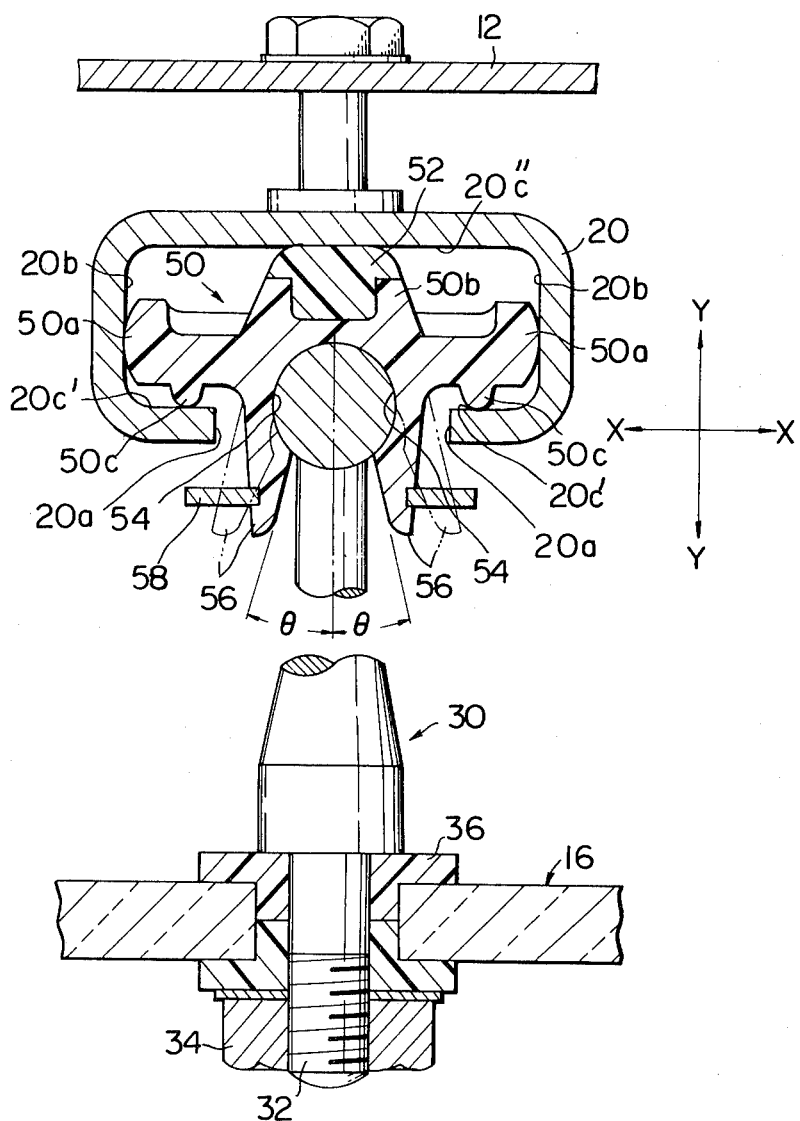

VEHICLE WINDOW GUIDE ASSEMBLY

This invention relates to vehicle body window regulators for moving the vehicle body window panel between open and closed positions and in particular to an improved guiding arrangement for vehicle body door window panels.

In typical guiding arrangements, door window panels are guided between raised closed positions and lowered open positions by spaced guide rollers which follow spaced guide channels mounted on door inner panels or other suitable parts. There is much room for further improvement to conventional guide arrangements and assemblies, particularly in designing and configuring guide rollers and in a member connecting the guide rollers to the window panels. It will greatly depend on the design and arrangement of these elements to smooth the movement of the window panel with lighter regulating effort, to increase the stability of the window mounting, in particular during high-speed running of the vehicle, to prolong the life of the components of the guide assembly, etc.

It is therefore a general object for this invention to provide a guide assembly of a vehicle body window which meets the aforementioned demands and requirements. Another object of this invention is to provide an improved guide assembly for a vehicle body window wherein the window panel is connected to the guide rollers by means of ball joints to permit limited angular displacement relative to each other. Still another object of this invention is to provide a guide assembly for a vehicle body window in which each guide roller is in constant engagement with the inner surface of the guide channel through several projected slide surfaces formed on the guide roller.

These and other objects and various features and advantages of this invention will be readily apparent from the following detailed description and drawings, wherein:

FIG. 4 is an enlarged sectional view showing a preferred embodiment of a window guide assembly according to this invention.

Figure 1:
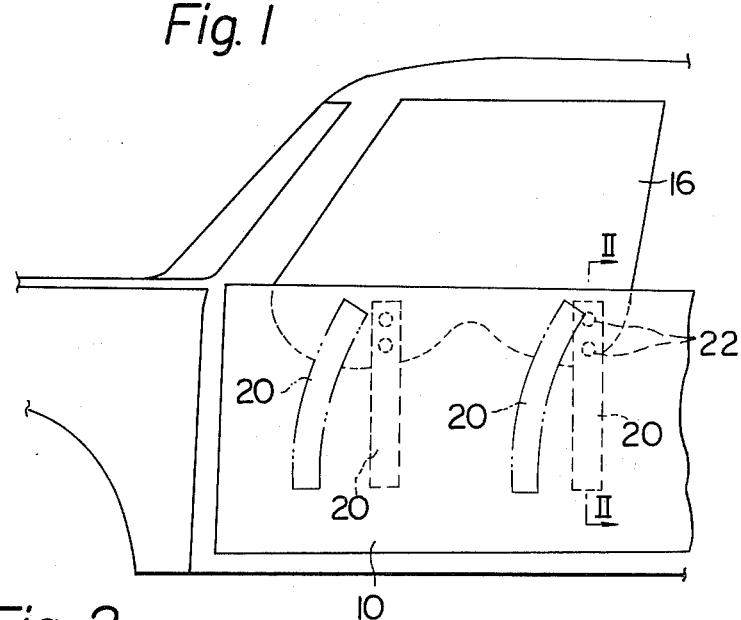
FIG. 1 is a schematic view generally showing an automobile body incorporating a door window guide assembly.
Figure 2:
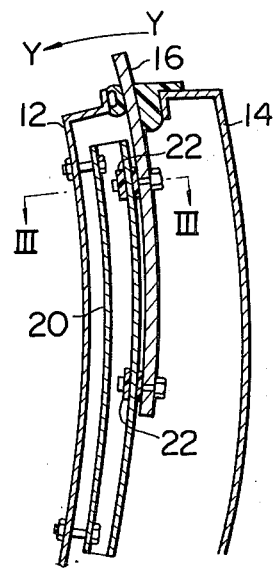
FIG. 2 is a section view taken along line II — II of FIG. 1 showing a prior art arrangement of a door window guide assembly.
Figure 3:
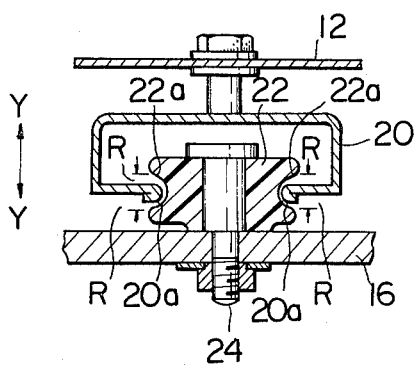
FIG. 3 is a section view taken along line III — III of FIG. 2.

Referring to FIGS. 1 to 3, a vehicle body door 10 includes an inner panel 12 and an outer panel 14 which provide a door window well when a window panel 16 is moved from a raised, closed position to an open, lowered position. The window panel of glass or other transparent material is moved and controlled between the two positions by means of any conventional window regulator, for instance of the cross arm type (not shown) including a window guide assembly.

The assembly comprises a pair of guide channels 20 arranged exemplarily as shown in FIG. 1 at a suitable longitudinal spacing, as is common in a hard-top type automobile body. Although the guide channels 20 may extend vertically straight as indicated by broken lines, it is preferable that they be shaped curvilinearly as indicated by phantom lines 1 for a reason that will be later apparent.

As best seen in FIG. 3, two or more vertically spaced guide following members or guide rollers 22 are each fastened to the window pane by bolts and nuts 24 for up and down movement of the window pane along the guide channel 20. The guide roller 22 is, for instance, of a type having a circumferential groove 22a which engages opening 20a of the guide channel 20, ensuring reciprocal sliding movement of the guide roller along the guide channel.

The aforedescribed typical arrangement of a conventional guide assembly is associated with some defects and difficulties to be described below.

By way of example, a sufficiently large width R (FIG. 3) of the groove 22a is desirable in order that less effort be required to effect raising and lowering movement of the window pane along the guide channel. However, such a large width of the groove will result in rattling of the window particularly in a direction of Y — Y of FIG. 2. If the groove is too narrow, excessive frictional contact between the guide roller and guide channel will make the operation of the window regulator heavy and difficult.

Also, it is usually recognized that to increase air tightness between a window weatherstrip provided at a window frame and the upper periphery of the window pane in its raised, closed position, it is effective to substantially differentiate the curvature of the window pane from that of the guide channel. This is because the window pane guided by the guide channel of different curvature is tightly pressed against the weather strip and the resultant resilient reaction force urges the window pane oppositely against an outboard portion of the weatherstrip. This desirably alleviates the window noise owing to the differential pressure between the inboard and the outboard window surfaces during high-speed running of the vehicle.

However, the greater is the difference between the curvatures of the window pane and the guide channel, the more the uneven frictional contact between the guide roller and the guide channel is significant, causing a heavier and less stable movement of the window pane. Also, the guide roller will locally severely wear making the smooth operation of the window pane further difficult.

As already mentioned, it is preferable to curve the guide channels in a longitudinal direction of the vehicle body as in FIG. 1. By guiding the window pane along such a curved path, the length required for movement of the window pane is somewhat reduced than guiding it along the straight guide channel. As a result, the longitudinal length of the window well formed at the door body may be smaller, which will desirably reduce the overall weight and size of the door body. The area requiring sealing between the window well and the window pane can also be reduced. Curvilinear guide channels, however, again result in uneven frictional contact being developed between the guide roller and the guide channel.

This invention is especially devoted to the solution and elimination of the difficulties derived from the contradictory requirements for the window guide assembly as specifically explained above.

The preferred embodiment of the window guide assembly according to this invention is now described in connection with FIG. 4, the description being not for limitation of the invention to the exact construction illustrated and described but permitting various changes and modifications within the spirit and scope of the invention. The guide assembly comprises a tapered shaft 30 at its bottom end fastened to the lower peripheral portion of the window pane by means of bolt 32 and nut 34. Preferably, a bushing 36 of elastomeric material is interposed between the bolt and the window pane. An opposite end of the tapered shaft integrally carries a ball or spherical member 40.

A guide channel, which may be of conventional configuration, has side walls 20b and two base walls 20c joined together by the side walls, one of which 20c' defines an opening 20a and the other of which 20c" is fixed to the door inner panel 12 by means of a stud (no number) or the like. Two or more vertically spaced guide rollers 50 are accommodated within the channel of the guide channel, only one of which is herein referred to for brevity. The guide roller is of substantially trapezoidal shape, the side surfaces of which facing the side walls 20b of the channel being respectively formed with projected slide surfaces 50a in engagement with the side walls. Also, the top surface (in the drawing) of the guide roller facing the base wall 20c" is provided with a projection 50b in which a damper block 52 is embedded and engages the base wall. The material of the damper block should be of higher resiliency than that of the guide roller. At the bottom surface (in the drawing) are formed two rounded ribs 50c respectively engaging the base wall sections 20c' on either side of the opening 20a.

The central portion of the guide roller 50 forms a ball socket member or spherical recess 54 which snugly receives the ball 40 carried on the shaft 30, providing a ball-joint connection between the shaft and the guide roller. The peripheral portion of the spherical recess extends outwardly of the guide channel to form two or more leg-shaped extensions 56 which serve as ball joint retainers. Since the extensions are gradually tapered toward the ball to keep a sufficient resiliency, they are expansible radially outwardly as indicated by a broken line, facilitating fitting the ball 40 into the recess 54. After the ball has been engaged in the recess, the extensions 56 are tightened inwardly by an E-ring or band clamp or other suitable clamping means for retaining the ball in position.

In operation, during up and down movement of the window pane, the guide roller is moved in constant engagement with the walls of the guide channel through the respective projections of the guide roller surfaces. Inasmuch as there is no unnecessary clearance between the guide roller and the guide channel yet with a minimum frictional contact therebetween, a stable movement of the window pane along the guide channel is ensured by this construction. More specifically, rattling in a direction X—X in the Figure is prevented by the sliding contact between the slide surfaces and the side walls, while rattling in direction Y — Y, which is most likely to occur in a conventional assembly is efficiently alleviated by particularly providing the damper block.

According to another feature of this invention, the shaft 30 is connected to the guide roller 50 in the manner of a ball joint, permitting the shaft to swing or tilt in an arbitrary plane with respect to the guide roller by a limited angle $\theta$. Even if the window pane is guided along a guiding path of different curvature than that of the window pane, the guide roller is constantly maintained in a proper locational relationship with the guide channel by slight angular displacement of the shaft longitudinally of the guide channel. This apparently prevents excessive localized friction between the guide roller and the guide channel, ensuring lighter and smoother movement of the window glass.

Also, rattling and excessive friction in a longitudinal direction of the vehicle body or in a direction X — X is adequately absorbed by angular displacement of the shaft in the same direction. This is particularly advantageous when the guide channel is curved longitudinally of the vehicle body as in FIG. 1 for the purpose previously mentioned.

Although the guide assembly of this invention is described as being employed with a vehicle door window pane, it would be obvious that it may be applied to a rear side window or any other suitable part of the vehicle body with minimum modification.

What is claimed is:

1. The combination of a vehicle body window pane and a window guide assembly for guiding movement of the vehicle body window pane between a raised, closed position and a lowered, open position comprising:
   an elongated guide channel element extending substantially in the direction of the raising and lowering movement of the window pane and having a top base wall, two side walls and a bottom base wall with an opening,
   at least one substantially tapezoidal, resilient guide following element slidably reciprocably received within said guide channel and having a slide surface facing the top base wall of said guide channel,
   a resilient damping block embedded in said slide surface of the guide following element and being in constant engagement with the top base wall, said damping block being of higher resiliency than that of the guide following element,
   a shaft element having two ends, one of said ends being fastened to said window pane,
   ball joint means provided at the other of said ends of the shaft element, and
   socket means provided substantially at the center portion of the guide following element for detachably receiving said ball joint to thereby establish a ball joint connection between the shaft element and said guide following element.

2. The combination as defined in claim 1, in which said socket means includes a spherical recess formed in the guide following element on the side opposite to the damping block, a plurality of resilient leg-shaped extensions integrally extending from the peripheral portion of said spherical recess and clamp means to clamp the extensions for retaining said ball joint means received in the spherical recess.

3. The combination as defined in claim 2, further comprising two side surfaces of the guide following element, a respective projection formed on each of the side surfaces and in sliding engagement with the side walls of said guide channel.

4. The combination as defined in claim 3, further comprising two rounded ribs formed on the surface of the guide following element opposite to the damper block and in sliding engagement with the bottom base wall of the guide channel element.

* * * * *